C. F. HOPEWELL.
SPARE TIRE CASE.
APPLICATION FILED FEB. 2, 1912.
1,026,316.
Patented May 14, 1912.
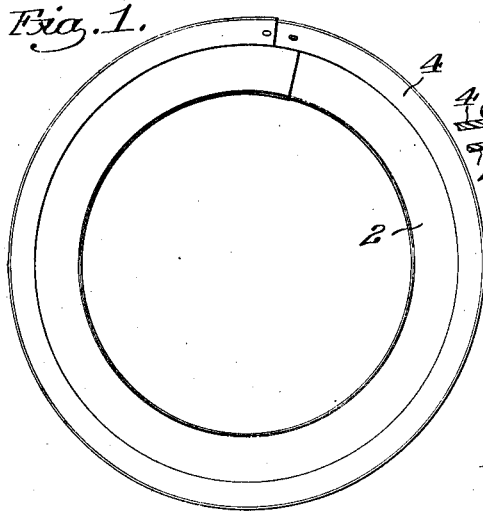
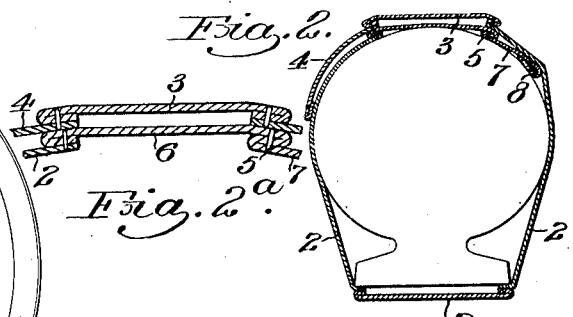
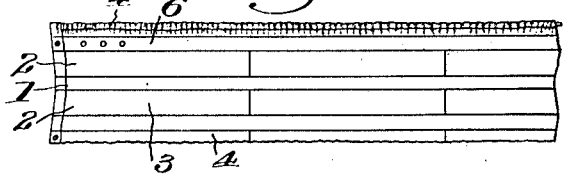
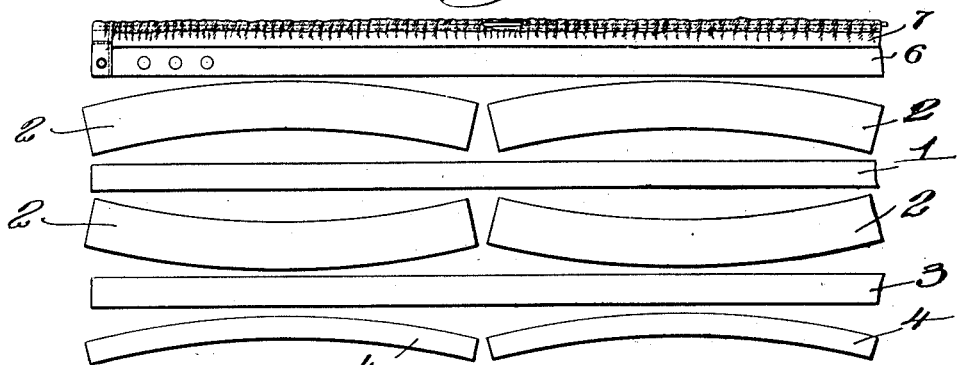
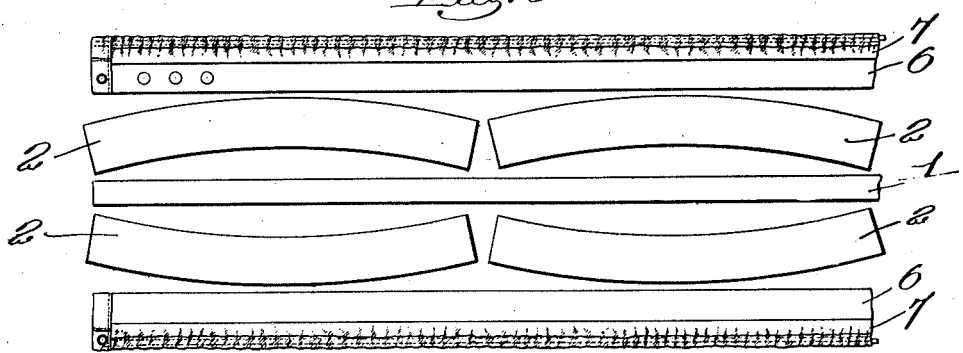
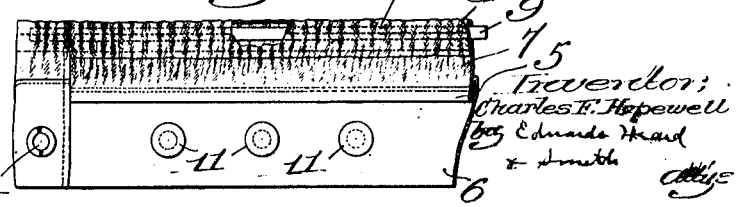

UNITED STATES PATENT OFFICE.

CHARLES F. HOPEWELL, OF NEWTON, MASSACHUSETTS.

SPARE-TIRE CASE.

1,026,316.  Specification of Letters Patent.  Patented May 14, 1912.

Application filed February 2, 1912. Serial No. 674,885.

*To all whom it may concern:*

Be it known that I, CHARLES F. HOPEWELL, a citizen of the United States, residing at Newton, Massachusetts, have invented an Improvement in Spare-Tire Cases, of which the following description, in connection with the accompanying drawing, is a specification, like characters on the drawing representing like parts.

This invention has for its object the production of a novel form of tire case for enveloping and protecting a spare tire, such as is used on automobiles.

The object of the invention is to provide a case of this character which shall be economical in its construction, which shall fit snugly against and cling to the tire so as to prevent so far as possible the entrance of dust and moisture, and which shall present a pleasing exterior appearance.

The chief feature of the invention resides in the construction devised for one or both of the longitudinal sections of the tire case at its edges whereby the desired fit and appearance of the tire case is obtained with a minimum amount of material.

The nature of the invention will more fully appear from the accompanying description and drawings and will be particularly pointed out in the claims.

The drawings represent preferred forms of spare tire cases embodying the invention.

In the drawings: Figure 1 is a side elevation of the tire case in position; Fig. 2 is a cross section of the tire case in the form which it assumes when in position, with a tire shoe shown in outline; Fig. 2ª is a fragmentary detail view on an enlarged scale; Fig. 3 is a plan view of one end of the tire case; Fig. 4 is an inner face view of a portion of the tire case, showing the various sections which go to make up the case, these sections being disconnected and arranged in their relative positions adjacent the sections with which they are to be connected; Fig. 5 is a view, similar to Fig. 4, of a slightly different form embodying the invention; Fig. 6 is an enlarged detail view of a portion of one of the exterior edge strips of the tire case.

A tire case of this type is made of suitable material, preferably water-proof or water repellant, and is composed of several pieces united or stitched together to form an elongated strip of a shape adapted, when its ends are brought together and fastened, to embrace and wrap the annular tire.

In the present construction the tire case comprises a bead strip 1 consisting of a long, straight, parallel edged strip designed to fit against the generally cylindrical bead surface of the tire. It also comprises concentric circular edged flange strips united at their concave edges to the edges of the bead strip. It is obviously impractical to cut these flange strips in continuous pieces, and hence they are usually formed in sections, as shown at 2, these sections being stitched together at their adjacent ends and then the concave edge of each strip stitched to the adjacent edge of the bead strip. These flange strips fit against and cover the side portions of the tire. The tire case also comprises tread sections at each edge of the case. These sections fit against and cover the tread portion of the tire and the one section overlaps the other. The present invention has particularly to do with the construction of these tread sections and may be embodied in either one or both of the tread sections. In Fig. 4 the invention is shown as a tire case in which but one tread section has the improved and novel construction, while in Fig. 5 both tread sections have such construction.

Each tread section is stitched or united to the convex edge of the adjacent flange strip, and it covers the tread portion of the tire and extends down well over the side of the tire, so that it may fit against the side portion and hold the case in place. That portion of the tread section fitting against the tread should be substantially cylindrical when in position, and must therefore comprise a long, straight strip similar to the bead strip, and such for example as shown separately at 3 in Fig. 4, and it must also comprise a portion circular in shape when in place and having concentric circular edges similar to the flange strips, and when made separately this portion is shown in sections at 4 in Fig. 4. But the making of the tread section in separate strips 3 and 4, one straight and the other circular, involves a great deal of work and a great waste of material. In the present invention the tread section is formed of a single straight edged strip of the material, shown at the upper portion of Fig. 4, the upper and bottom portions of Fig. 5, and in Fig. 6. Between the edges of this strip a folded line of demarcation is formed by folding the material and stitching it in its folded condition, as shown at 5 in Fig. 6. This divides the tread section into two portions, the portion 6 being adapted to fit against the tread and the portion 7 being adapted to fit against the side of the tire. To secure this circular construction of the portion 7 the free edge of the strip is puckered and secured in its puckered condition. This is accomplished by hemming the free edge as shown at 8, inserting a puckering strip, as a tape 9, puckering the edge until the free edge is of the required circumference to fit snugly against the side of the tire, and then permanently securing the pucker, as by sewing a line of stitching 10 through the material and through the puckering tape 9. The fold 5 divides the portions 6 and 7 of the tread section so that there is presented in one integral piece of the material a straight edged strip corresponding in effect to the strip 3, and a curved strip 7 corresponding in effect to the strip 4. This construction is preferably employed at both edges of the tire case, but the advantages of the invention will be better secured by employing it at one edge, as shown in Fig. 4.

The tire case is provided at its ends with suitable means, such as snap fasteners 11, whereby it can be adjusted to conform to tires of different diameter.

Having fully described my invention, what I claim as new and desire to secure by Letters Patent is:

1. A spare tire case comprising a straight edged bead strip, concentric circular edged flange strips united at their concave edges to the edges of said bead strip, tread sections united respectively to the concave edges of said flange strips, one of said tread sections folded and fastened between its edges to present a line of demarcation, and means to maintain the free edge of said tread section permanently puckered whereby the outer portion of the tread section between the folded line of demarcation and the puckered edge will conform to the curved side of the tire when in place.

2. A spare tire case comprising a straight edged bead strip, concentric circular edged flange strips united at their concave edges to the edges of said bead strip, tread sections united respectively to the concave edges of said flange strips, one of said tread sections folded and fastened between its edges to present a line of demarcation, and having its free edge hemmed, a cord of substantially less length than the said edge located in said hem and permanently secured at its ends whereby the said edge is held permanently puckered so that the outer portion of the tread section between the folded line of demarcation and the puckered edge will conform to the curved side of the tire when in place.

3. A spare tire case comprising a straight edged bead strip, concentric circular edged flange strips united at their concave edges to the edges of said bead strip, tread sections united respectively to the convex edges of said flange strips, each of said tread sections folded and fastened between the edges thereof to present a line of demarcation, and means to maintain the free edges of said tread sections permanently puckered whereby the outer portions of said tread sections between the folded lines of demarcation and the puckered edges will conform to the curved sides of the tire when in place.

4. A spare tire case comprising a straight edged bead strip, concentric circular edged flange strips united at their concave edges to the edges of said bead strip, tread sections united respectively to the convex edges of said flange strips, each of said tread sections folded and fastened between the edges thereof to present a line of demarcation, and having their free edges hemmed, cords of substantially less length than said edges located respectively in said hems and permanently secured at their ends whereby the said edges are held permanently puckered so that the outer portions of said tread sections between the folded lines of demarcation and the puckered edges will conform to the curved sides of the tire when in place.

In testimony whereof, I have signed my name to this specification, in the presence of two subscribing witnesses.

CHARLES F. HOPEWELL.

Witnesses:
 BESSIE G. MORRIS,
 FREDERICK S. GREENLEAF.